United States Patent
Badacsonyi et al.

(10) Patent No.: US 12,402,573 B1
(45) Date of Patent: Sep. 2, 2025

(54) MOSS POLE FOR PLANT SUPPORT AND WATERING

(71) Applicants: Tamas Akos Badacsonyi, Zalacsany (HU); Nikoletta Badacsonyi-Kovacs, Zalacsany (HU)

(72) Inventors: Tamas Akos Badacsonyi, Zalacsany (HU); Nikoletta Badacsonyi-Kovacs, Zalacsany (HU)

(*) Notice: Subject to any disclaimer, the term of this patent is extended or adjusted under 35 U.S.C. 154(b) by 0 days.

(21) Appl. No.: 18/656,986

(22) Filed: May 7, 2024

(51) Int. Cl.
| | |
|---|---|
| *A01G 9/12* | (2006.01) |
| *A01G 29/00* | (2006.01) |
| A01G 22/63 | (2018.01) |
| A01G 27/04 | (2006.01) |

(52) U.S. Cl.
CPC .......... *A01G 9/122* (2013.01); *A01G 29/00* (2013.01); *A01G 22/63* (2018.02); *A01G 27/04* (2013.01)

(58) Field of Classification Search
CPC .......... A01G 9/12; A01G 9/122; A01G 9/124; A01G 17/14; A01G 27/00; A01G 27/006; A01G 27/04; A01G 29/00; A01G 24/25
USPC .................................................. 47/44–48.5
See application file for complete search history.

(56) References Cited

U.S. PATENT DOCUMENTS

| | | | |
|---|---|---|---|
| 2008/0209802 A1* | 9/2008 | Williams ............... | A01G 29/00 47/47 |
| 2010/0064579 A1* | 3/2010 | Braun ................... | A01G 29/00 29/428 |
| 2022/0071104 A1* | 3/2022 | Cheng ................... | F16B 7/182 |

FOREIGN PATENT DOCUMENTS

| | | | | |
|---|---|---|---|---|
| CA | 3070688 | A1 * | 8/2021 | |
| CN | 204707580 | U * | 10/2015 | |
| CN | 107343450 | A * | 11/2017 | .......... A01G 27/005 |
| GB | 1294269 | A * | 10/1972 | |

OTHER PUBLICATIONS

Screen Captures of YouTube video clip entitled "DIY Coco Coir Climbing Poles | Moss Pole Alternative" uploaded on Jan. 13, 2023 by user "smallthingswithmoumita9444". Retrieved from Internet: <https://www.youtube.com/shorts/PIjLPIO_XtM>. (Year: 2023).*
Kalalou H8724 Natural & White Small Funnel Planter, One Size, Cream & Natural Terracotta. Amazon Product with Reviews [online]. Kalalou, 2022 [retrieved on Mar. 26, 2025]. Retrieved from the Internet: <https://www.amazon.com/Kalalou-KALH8724-Planter-Size-Cream/dp/B074W6LLYR#averageCustomerReviewsAnchor>. (Year: 2022).*

(Continued)

*Primary Examiner* — Joshua D Huson
*Assistant Examiner* — Brook Victoria Schmid

(57) ABSTRACT

The present invention relates to a novel moss pole designed for plant support and watering. The pole comprises a first elongated hollow perforated structure or pole, a second elongated structure, and absorbent materials surrounding both structures. Optional flexible lateral arms and optional fixing legs are provided for supporting lateral branches and enhancing stability in the soil. This innovative moss pole addresses issues of water wastage, rapid drying of moss, weak grip in soil, and lack of support for lateral branches, offering improved water conservation, plant health, stability, and support for gardeners and plant enthusiasts.

17 Claims, 7 Drawing Sheets

(56) References Cited

OTHER PUBLICATIONS

'Easy DIY Self-Watering Moss Pole'. Cori Sears [online]. Dec. 4, 2022 [retrieved on Mar. 27, 2025]. Retrieved from the Wayback Machine Internet Archive. <https://web.archive.org/web/20221204044450/https://corisears.ca/how-to-make-a-diy-self-watering-moss-pole/> (Year: 2022).*

Blog Post entitled "Growing Silver Sword Philodendron on a Moss Pole." Pomme Pom [online]. Apr. 15, 2024 [retrieved on Mar. 25, 2025]. Retrieved from the Internet: <https://pommepom.com/growing-silver-sword-philodendron-on-a-moss-pole/>. (Year: 2024).*

Large Modular Reusable Moss Pole. Etsy Product with Reviews [online]. 3DPLCanada, 2022 [retrieved on Mar. 26, 2025]. Retrieved from the Internet: <https://www.etsy.com/listing/1202298032/large-modular-reusable-moss-pole-6cm>. (Year: 2022).*

'Trofolia Straight-Up Robust MossPoles'. Trofolia [online]. Oct. 1, 2023 [retrieved on Mar. 25, 2025]. Retrieved from the Wayback Machine Internet Archive. <https://web.archive.org/web/20231001024414/https://trofolia.com/products/trofolia-straight-up-robust-moss-pole> (Year: 2023).*

\* cited by examiner

MOSS POLE FOR PLANT SUPPORT AND WATERING

BACKGROUND

The present invention pertains to a moss pole designed for plant support and watering, addressing issues such as water wastage, rapid drying of moss, weak grip in soil, and support for leaves and lateral branches of plants.

Monstera and similar plants are popular among people growing plants inside the house. Its original habitat is the jungles of Central America, the tropical rainforests of Mexico, Guatemala, Panama, and Costa Rica, where it climbs up to 20 meters high on tree trunks from diffused light, humid and rainy undergrowth, often reaching the crown of the tree. It climbs up the tree with its long, tendril-like aerial or hand-holding roots. Monstera aerial roots can be trained to climb e.g. plant support poles or other supports as well, which can help the plant grow taller and stronger. It is a moderately water-demanding plant and does not like stagnant water. The best solution is to let the top few centimeters layer of the soil dry out after a more thorough watering and only then water again.

There is another plant that likes to live on the trunk of the trees, it is called Epiphytic orchid. Epiphytic orchids are a type of orchid that grows without soil or potting media, often attaching itself to trees instead. These plants have adapted to a unique lifestyle, thriving in the humid and warm environments of tropical rainforests, where they can obtain water and nutrients from the air around them. They only need a trunk/pole to grow on, but they also need some natural fiber, e.g. coconut coir that can hold water under them so that they can obtain water from the humidity of the coconut coir.

These characteristics of the plants encourage the development of a plant support pole that serves both as physical support for these plants, as well as a solution for their special humidity, water consumption needs, like their natural habitat.

There are several kinds of plant support poles (mostly called moss poles) around the world. Most of them available are only namely called moss poles, but they are rather coconut coir covered poles. Originally, they were created with a similar idea to hydrate the plants with the use of moss/coconut coir around the pole.

The moss/coconut coir around the pole can get dry very quickly, the job is to keep the moss wet that hydrates the plants too, but the prior art does not provide a solution for this. The coir can be watered from the side top regularly, but there is no solution for retaining the water there for long, it mostly flows down due to gravity or simply evaporates. So, the traditional moss poles used for plant support and watering often encounter challenges such as rapid water drainage, quick drying of moss, instability in the soil, and lack of support for lateral branches and leaves.

The above information disclosed in this background section is only for enhancement of understanding of the background of the inventive concept, and, therefore, it may contain information that does not form the prior art that is already known to a person of ordinary skill in the art.

SUMMARY

The present invention introduces a novel coir pole that effectively addresses these challenges. The invention comprises a first elongated hollow perforated structure or pole, which may be made of plastic or any other suitable material and can be of various shapes such as circular, square, etc. A second elongated structure is designed to attach with the first hollow structure, which may be hollow or solid and without holes. It is stackable, one can twist together as many of the second bodies as it needs according to the growing height of the plant. Optional flexible arms are attached to this second body to support the lateral branches of plants. Both structures, the first body and the second body, are surrounded by absorbent materials, cotton fiber and coconut coir rope, to enhance water retention. There is also a third body, a funnel part, that has an upper wider part and a lower elongated, narrower part. The funnel is hollow from inside and has a hole at its tip and is inserted and fixed into the soil. Additionally, detachable legs are provided for firm support of the pole in the soil.

BRIEF DESCRIPTION OF THE DRAWINGS

The accompanying drawings, which are included to provide a further understanding of the inventive concepts and are incorporated in and constitute a part of this specification, illustrate exemplary embodiments of the inventive concepts, and, together with the description, explain the principles of the inventive concepts.

DESCRIPTION OF THE INVENTION

Figure 1:
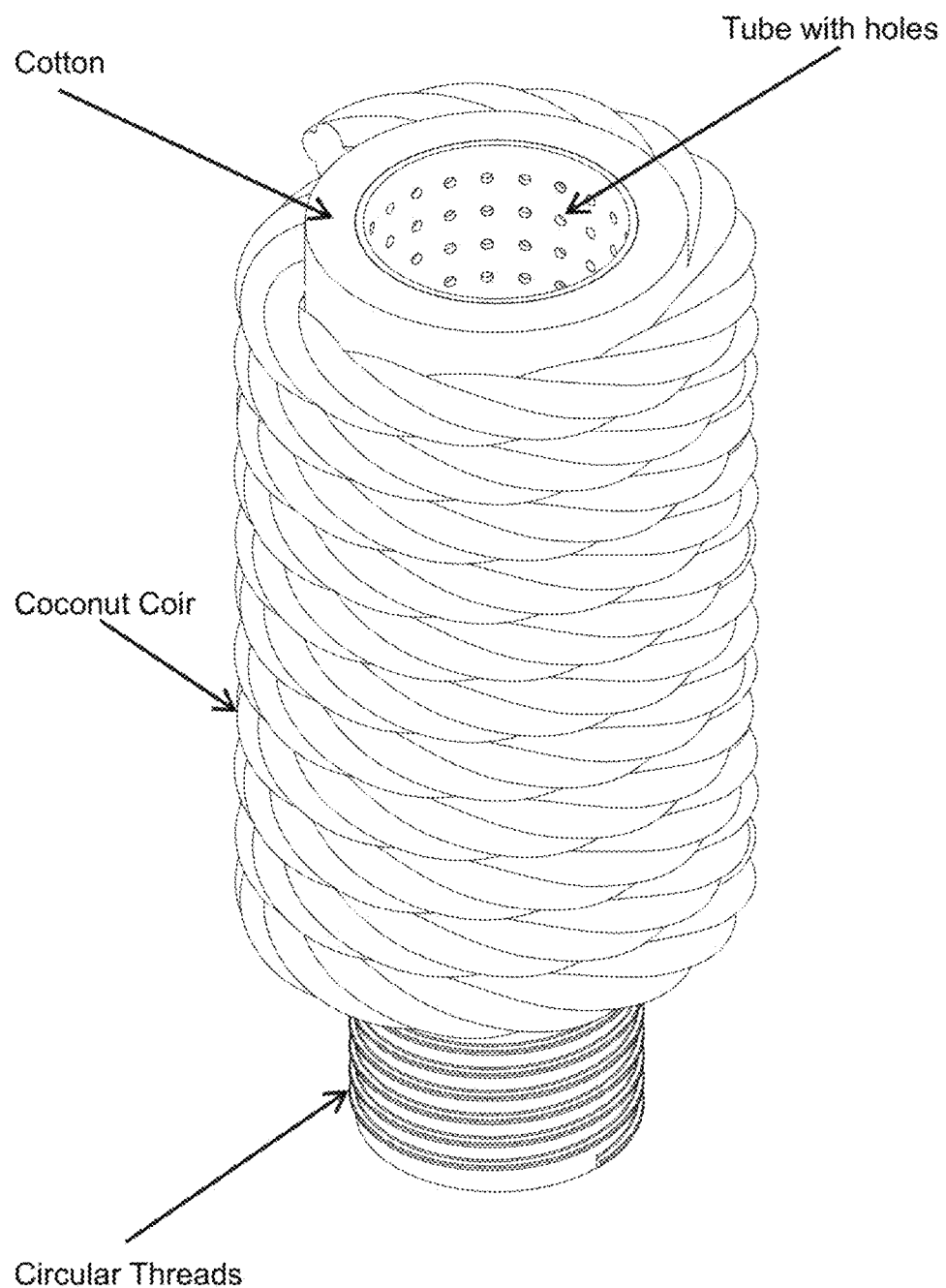
FIG. 1 is an isometric view and illustrates the structure of the first elongated body of an embodiment of the invention.
Figure 2:
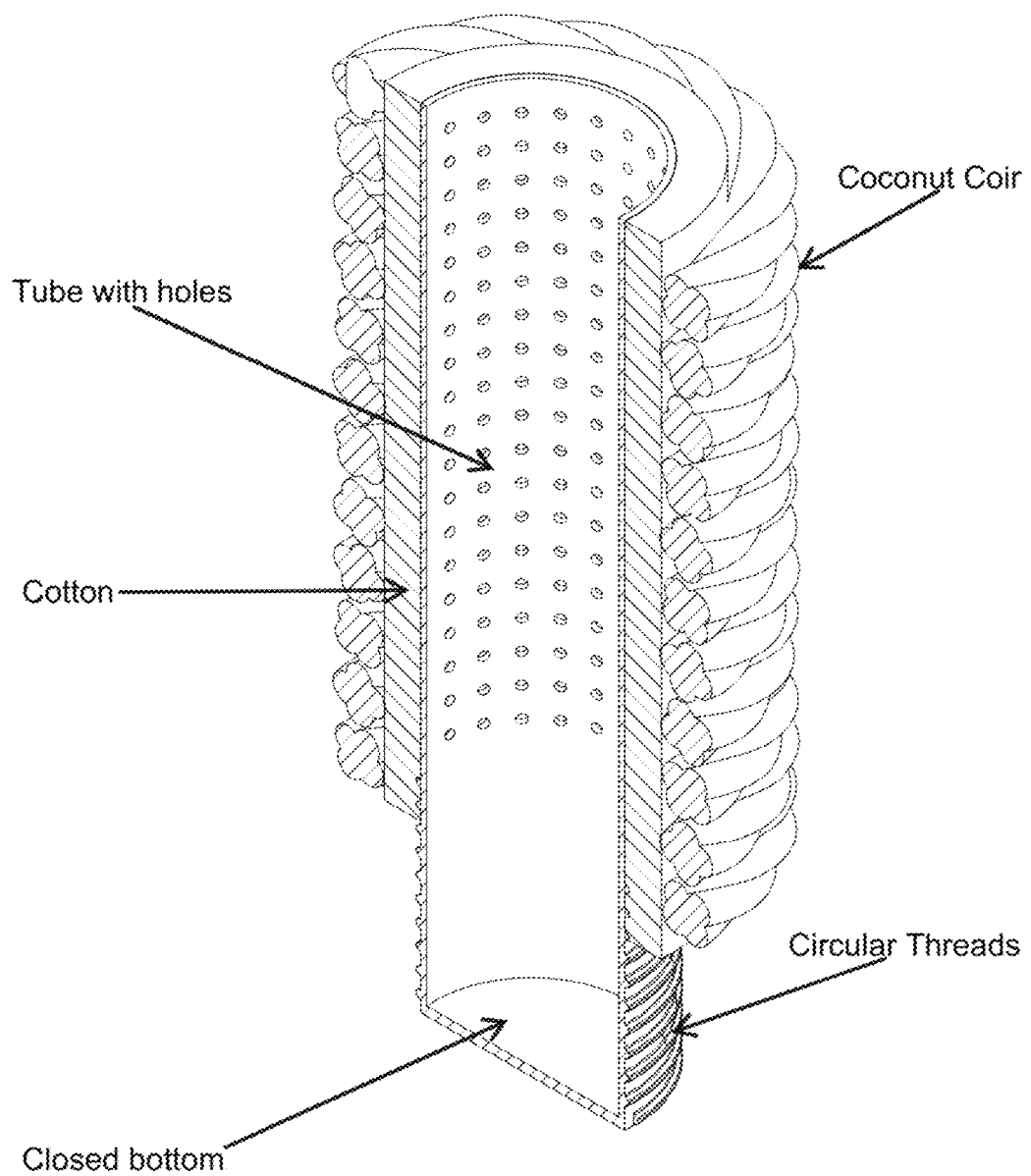
FIG. 2 is a cross-section and illustrates the structure of the first elongated body of an embodiment of the invention.
Figure 3:
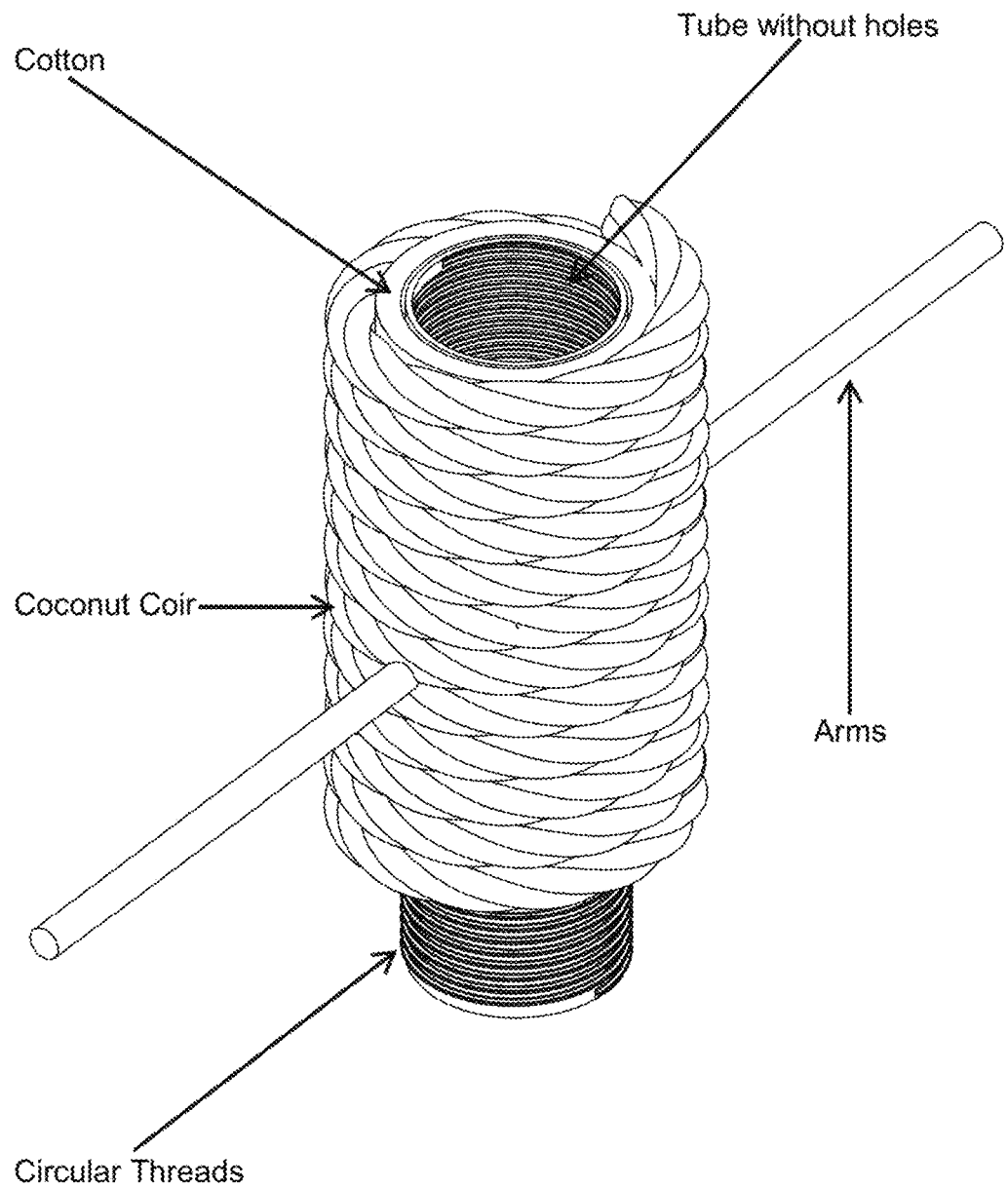
FIG. 3 is an isometric view and illustrates the structure of the second elongated body, with optional arms, of an embodiment of the invention.
Figure 4:
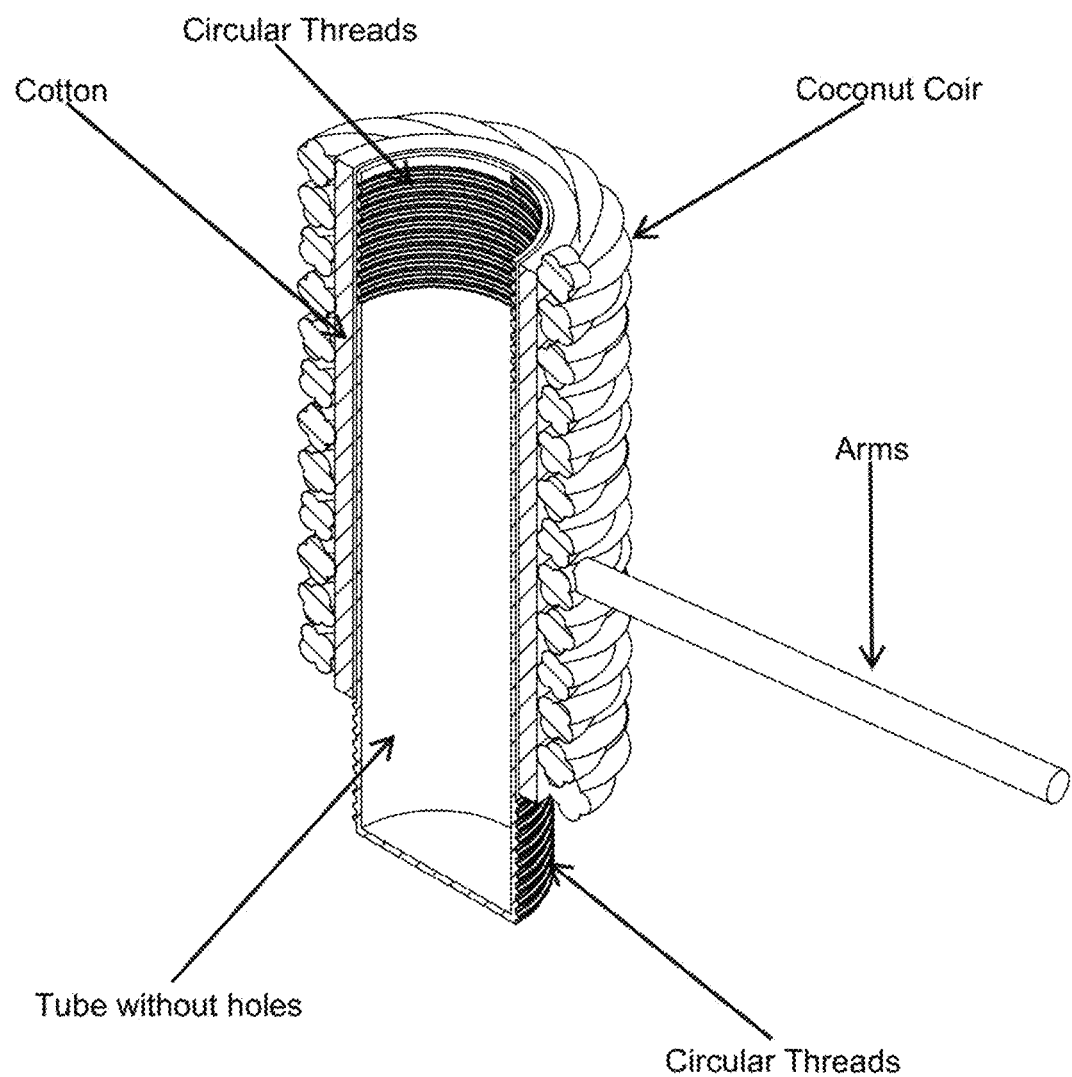
FIG. 4 is a cross-section and illustrates the structure of the second elongated body, with optional arms, of an embodiment of the invention.
Figure 5:
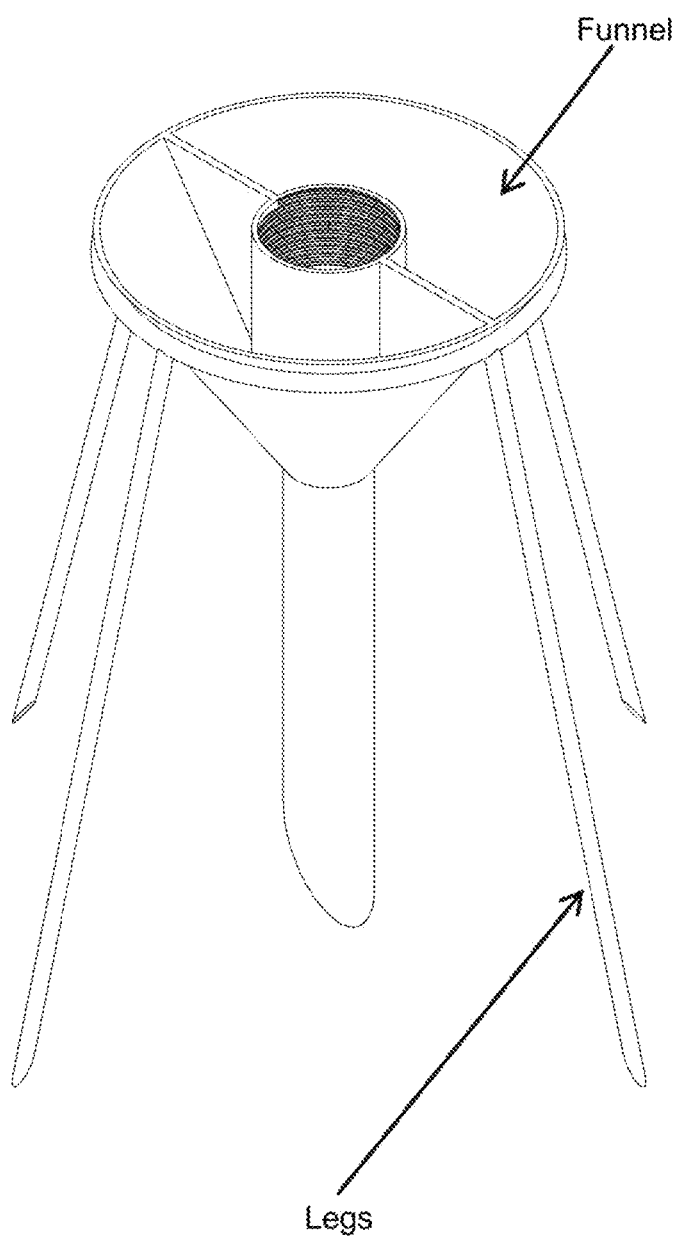
FIG. 5 illustrates the third body, the funnel and structure with legs.
Figure 6:
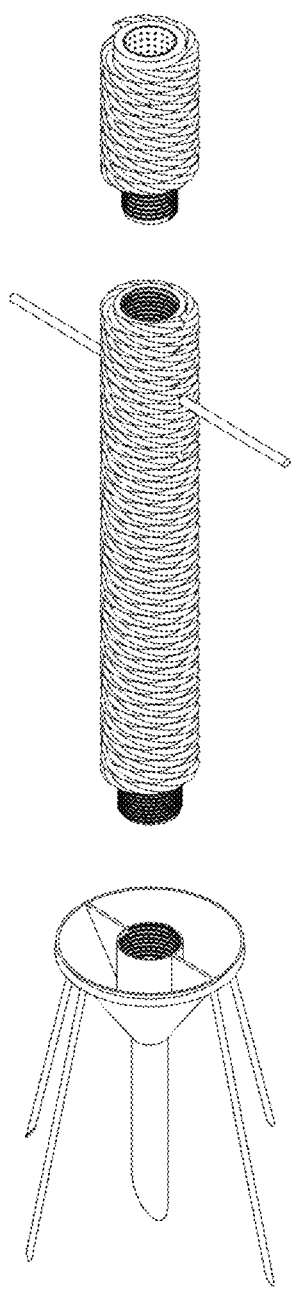
FIG. 6 is an exploded view of an embodiment of the invention.
Figure 7:
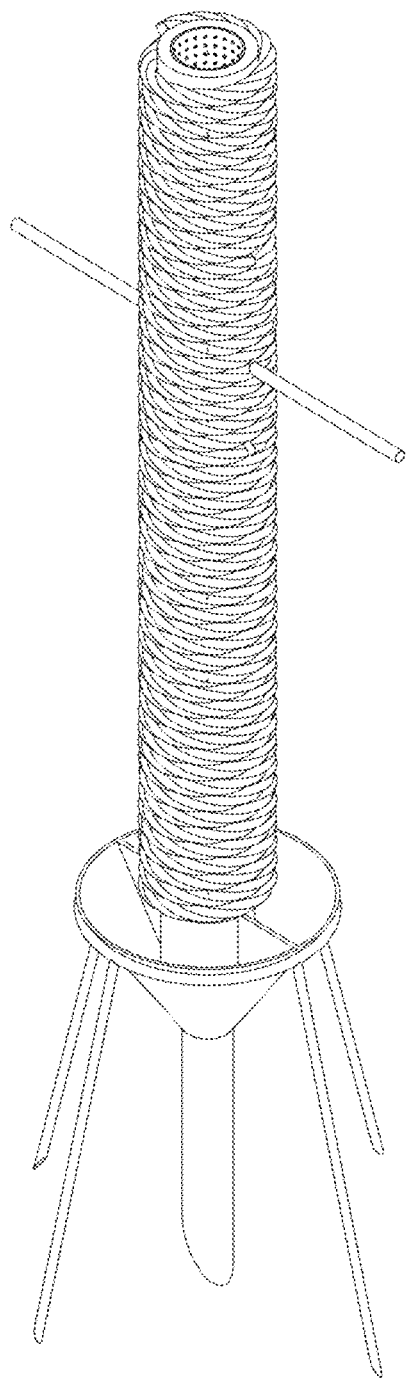
FIG. 7 is an isometric view of an embodiment of the invention.

In the following description, for the purposes of explanation, numerous specific details are set forth to provide a thorough understanding of various exemplary embodiments. It is apparent, however, that various exemplary embodiments may be practiced without these specific details or with one or more equivalent arrangements.

In the accompanying figures, the size and relative sizes of elements may be exaggerated for clarity and descriptive purposes.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

The invention is a device or a pole, for supporting and watering a plant, comprised of, a first elongated body, a second elongated body, with optional flexible arms, and a third funnel shaped structure, with optional legs. The first body is an elongated body and hollow from the inside. It is open at its top end and closed at its bottom end, and its side walls are perforated by a plurality of holes. The second elongated body is hollow from inside, but it is not perforated or does not have pores along its length. Water does not flow through this part, because all the water for irrigation is poured in the first, top part only, and from there through the perforated holes, water enters into the absorbent materials around the outside of the parts. This second body may optionally have arms that may be used for hanging plant leaves. The arms may be flexible, foldable and adjustable, as needed based on the plant's growth and requirements. The third, funnel part has an upper wider part and a lower elongated narrower part that has a hole at its tip to let the water flow through into the soil. The bottom end of the first body is attached to the top end of the second body and the bottom end of the second body is attached to the wider part of the third body, the funnel itself. One can stack as many amounts of second bodies on top of each other as the height of the plant requires it. The funnel is hollow from inside and is inserted and fixed into the soil.

The outer surfaces of the elongated bodies are surrounded by two layers of water absorbent materials. The first outer layer is of cotton fiber which is then surrounded by a second layer of coconut coir. The absorbents may be used in the following form: the first, cotton layer is a wrapping, the second, outer layer is coir rope/cord.

The bodies and the funnel may be made of plastic or any other material including, but not limited to, iron, steel, wood etc. and the bodies may have a circular, square, triangular, rectangular, hexagonal, pentagonal, or any other possible shape. The pores may be of any size and shape, but preferably micropores. The bodies and the funnel are designed to be attachable and detachable with each other, for example, each of them may have circular threads at the appropriate ends making it twistable to fit within the other part. The device may be designed as a single unit as well containing all the parts in fixed and non-detachable form.

The device may further comprise a structure with multiple legs. This structure can be fixed to the wider part of the funnel and is to provide extra support for better fixing of the device into the soil. This structure may be fixed or detachable and optionally used. The legs enhance the grip and stability of the device or pole, preventing it from tilting or falling over, especially when supporting heavy plants.

Water is poured into the first body from its top open end. The water then enters the first absorbent layer through the perforated side walls, then to the second absorbent layer, followed by dripping down through the absorbents into the funnel, and then into the soil through the open tip of the narrower part of the funnel.

A preferred embodiment of the invention is a pole that comprises the circular tubular hollow bodies or poles and the funnel, made of the plastic, wherein the first body has a plurality of micropores along its length, while the second body and the third body are without pores. All these parts are detachable from each other.

The invention is designed with an aim to keep the water all around the pole, under the coconut coir.

The absorbent material that now a days is mostly used to hold back the water is flower foam. The flower foam mostly consists of toxic and non-degradable material. It's made from synthetic, non-recyclable plastic and is created using a combination of carbon black, formaldehyde, and phenolic foam, which are all hazardous and toxic. Though it crumbles, the foam doesn't fully dissolve in water or degrade in landfill or soil. The present invention substitutes this flower foam with a bio-degradable 100% natural cotton fiber which may be the clean raw cotton waste material, that is not used in the textile industry, by this way supporting the idea of "circular economy" that reduces material use, by designing products to be less resource intensive, recapturing waste as a resource.

The invention solves the problem of quick water running down in the tube. The plastic tube of the first body is punched with several small holes, its bottom is closed, so water can only pour out from the side micro holes, into the cotton fiber and coconut coir, but not towards inside the bottom of the tube. It has an ending that can be twisted into the top part of the next connecting pole part. The punched plastic tube is covered first with cotton fiber and then on the outside with coconut coir rope. The coconut coir rope in the invention works much better than a normal coconut coir pad which is wrapped around the pole, because the rope carries and leads the soaked-up water in the way the rope is twisted around the pole. The generally available products in the market use just simple coconut coir, which even if gets wet somehow from watering, quickly absorbs and vaporizes water and does not fill the function of constantly watering the plant around it.

The watering of the plant and the coconut coir can be managed at the same time. The pole may be filled up with water from above so that the bio-degradable "flower foam" of the invention can suck it up and keep the outer coir hydrated. The water flows through the special water keeping natural fibers (cotton, coconut coir) down to the bottom of the pole. At the bottom of the pole there is a plastic funnel that collects all the water coming from above, that is not absorbed by the cotton and the coconut coir and slowly lets the water drip down through it into the soil, exactly to the roots of the plants. With the help of gravitation, the device will slowly and constantly water the plant's roots at the bottom as well as the coconut coir around the plastic tube at the same time.

The poles of the prior art often don't stay in their place and fall down. Users need extra "legs" to fix them in the pot, otherwise the plant will be wobbly and the whole pot can fall on the ground. The pole of the invention is made of parts that can be put together and stacked on each other, but the parts may not be too long, because it makes the whole pole wobbly. The less long the parts are, the more stable the pole will be. The device of the invention has legs that can be put to the funnel part and stabbed into the soil in order to fix the pole at the right place.

The invention provides a twistable and interchangeable piece of pole on which flexible little arms may be used for hanging the leaves or laying them on the wires to get more light and air and can also fix the plant with a symmetric distribution of the leaves. This is an optional part; users may use the plant support pole without it as well.

The Monstera and also the orchid both don't like to be overwatered, florists always advise that even if they are well watered, we should let the upper soil dry out 2-3 cm, deep, because it is not good for the plant to soak in water. It is a common situation that when you want to water the soil of the plant, the water often flows out of the pot to the ground if it is fully filled with plant particles and the soil just can't absorb the water immediately.

The invention provides a gradually slow water to the soil, resultantly, the plant does not soak in wet. Users can also put grain fertilizer into the watering tube and keep the plant healthy and nurtured slowly.

Advantages of the Invention

Water Conservation: The novel pole reduces water wastage by preventing rapid drainage and promoting even water distribution through its perforated design and absorbent layers.

Improved Plant Health: Consistent moisture provided by the absorbent layers and controlled watering system promotes healthier plant growth and reduces the risk of overwatering or underwatering.

Enhanced Stability: The legs that can be stabbed into the ground at the third, funnel part and the second elongated structure improve the grip and stability of the pole in the soil, preventing tilting or falling over.

Support for Lateral Branches: The optional flexible lateral arms provide support for the lateral branches of plants, promoting balanced growth and preventing breakage.

CONCLUSION

The novel moss pole for plant support and watering offers an innovative solution to the challenges associated with traditional moss poles. By combining a perforated hollow structure with absorbent materials, a second elongated structure, optional flexible lateral arms, and supporting legs, the invention provides improved water conservation, plant health, stability, and support for lateral branches, making it an ideal choice for gardeners and plant enthusiasts.

What is claimed is:

1. A device, for supporting and watering a plant, comprising:
   a first elongated hollow body having a top end, a bottom end, and side walls, wherein the first elongated hollow body is open at the top end, closed at the bottom end, and the side walls are perforated by a plurality of holes;
   a second elongated body having a top end and a bottom end; and,
   a third body comprising a funnel with an upper wider part, a lower narrower part, and a structure with multiple legs, wherein each leg is located at a distinct position around a perimeter of the upper wider part of the funnel such that each leg may be stabbed into soil at a distinct location from the other legs, so as to provide extra support for better fixing of the device;
   wherein the bottom end of the first body is attached to the top end of the second body, and the bottom end of the second body is attached to the wider part of the funnel;
   wherein outer surfaces of the first body and the second body are surrounded by a first layer of a first water absorbent material which is then surrounded by a second layer of a second water absorbent material; and,
   wherein the first elongated body is configured to receive water through the top open end, and is further configured such that water flows through the perforated side walls into the first absorbent layer, then into the second absorbent layer, and then drips down through the absorbent layers into the funnel, and subsequently into soil through the narrower part of the funnel.

2. The device of claim 1, wherein the second elongated body is a hollow body having non-perforated sidewalls, with multiple outward extended arms, for hanging plant leaves.

3. The device of claim 2, wherein there are multiple second bodies stackable to adjust a height of a growing plant.

4. The device of claim 2, wherein the arms are foldable and adjustable.

5. The device of claim 1, wherein the first water absorbent material is cotton fiber.

6. The device of claim 1, wherein the second water absorbent material is coconut coir.

7. The device of claim 6, wherein the coconut coir is in the form of a cord.

8. The device of claim 1, wherein the first body, the second body and the funnel are detachable.

9. The device of claim 8, wherein the top and bottom ends of the first elongated body and the second elongated body, and the upper wider part of the funnel, each comprise circular threads configured to allow the first elongated body, the second elongated body, and the funnel to be screwed and joined with one another.

10. The device of claim 1, wherein the funnel comprises a hole at a tip of the narrower part, the hole being configured to allow a slow flow-through of water into soil.

11. The device of claim 1, wherein the narrower part of the funnel is configured to be inserted and fixed into soil.

12. The device of claim 1, wherein the legs of the structure are separately fixable.

13. The device of claim 1, wherein there are multiple second bodies stackable to adjust a height of a growing plant.

14. The device of claim 1, wherein the first elongated body and the second elongated body each have a cross-sectional shape that is circular, triangular, rectangular, square, hexagonal, pentagonal, or another geometric shape.

15. The device of claim 1, wherein the second elongated body is hollow inside.

16. The device of claim 1, wherein the first body, the second body, and the funnel are made up of plastic, iron, steel, wood, or a combination thereof.

17. A method of supporting and watering a plant the method comprising:
   providing a device comprising:
      a first elongated body having a top end, a bottom end, and side walls, wherein the first elongated body is open at the top end, closed at the bottom end, and the side walls are perforated by a plurality of holes;
      a second elongated body having a top end and a bottom end, wherein the bottom end of the first elongated body is attached to the top end of the second elongated body;
      wherein outer surfaces of the first elongated body and the second elongated body are surrounded by a first layer of a first absorbent material, which Is further surrounded by a second layer of a second absorbent material;
      a funnel having an upper wider part and a lower narrower part, wherein the bottom end of the second elongated body is attached to the upper wider part of the funnel; and
      a structure with multiple legs, wherein each leg is located at a distinct position around a perimeter of the upper wider part of the funnel such that each leg may be stabbed into soil at a distinct location from the other legs, so as to provide extra support for better fixing of the device;
   placing the device such that the narrower part of the funnel is positioned within soil;
   pouring water into the first elongated body through the top open end; and
   allowing the water to pass through the perforated side walls into the first absorbent layer, then into the second absorbent layer, and subsequently drip into the funnel and into the soil through the narrower part of the funnel.

* * * * *